United States Patent
Ahmadvand et al.

(10) Patent No.: US 6,788,716 B2
(45) Date of Patent: Sep. 7, 2004

(54) MULTI-WAVELENGTH LASERS

(75) Inventors: Nima Ahmadvand, Ottawa (CA); Hamid Hatami-Hanza, Ottawa (CA)

(73) Assignee: Peleton Photonic Systems, Inc. (CA)

( * ) Notice: Subject to any disclaimer, the term of this patent is extended or adjusted under 35 U.S.C. 154(b) by 0 days.

(21) Appl. No.: 09/863,417

(22) Filed: May 24, 2001

(65) Prior Publication Data

US 2002/0012366 A1 Jan. 31, 2002

(30) Foreign Application Priority Data

May 29, 2000 (CA) .......................................... 2310199

(51) Int. Cl.[7] .............................................. H01S 3/098
(52) U.S. Cl. ........................................ 372/18; 372/20
(58) Field of Search ............................. 372/94, 96, 18, 372/19–22, 334, 341.1, 341.4, 341.41, 23; 359/341.1, 154, 135, 156, 337.13, 341.4, 337.1, 334, 341.41; 385/24, 28

(56) References Cited

U.S. PATENT DOCUMENTS

| | | | | | |
|---|---|---|---|---|---|
| 5,028,889 | A | * | 7/1991 | Fedan ........................ 331/183 |
| 5,434,701 | A | * | 7/1995 | Fatehi et al. ............. 359/341.4 |
| 5,537,243 | A | * | 7/1996 | Fatehi et al. ............. 359/341.1 |
| 5,841,571 | A | * | 11/1998 | Terahara ..................... 359/156 |
| 5,872,650 | A | * | 2/1999 | Lee et al. ............... 359/337.13 |
| 6,104,848 | A | * | 8/2000 | Toyohara et al. ........... 359/154 |
| 6,111,688 | A | * | 8/2000 | Kobayashi et al. ..... 359/337.13 |
| 6,160,657 | A | * | 12/2000 | Lee et al. ..................... 359/334 |
| 6,163,553 | A | | 12/2000 | Pfeiffer ........................ 372/6 |
| 6,323,991 | B2 | * | 11/2001 | Cisternino et al. .......... 359/135 |
| 6,341,034 | B1 | * | 1/2002 | Sun et al. ................ 359/337.1 |
| 6,417,965 | B1 | * | 7/2002 | Ye et al. ................. 359/341.41 |
| 6,519,081 | B2 | * | 2/2003 | Lelic et al. .............. 359/341.4 |
| 6,535,330 | B1 | * | 3/2003 | Lelic et al. ............ 359/337.13 |

* cited by examiner

*Primary Examiner*—Paul Ip
*Assistant Examiner*—Tuan N. Nguyen
(74) *Attorney, Agent, or Firm*—Katten Muchin Zavis Rosenman

(57) ABSTRACT

In this invention an optical gain element is used where a fraction of the optical output signal is passed through a periodic filter and fed back to the gain medium. This configuration simply forms a multi-wavelength ring laser. The optical gain element provides the gain medium for the laser and the filter forces the laser to lase on the predetermined wavelengths. The periodic filter can simply be an asymmetric Mach-Zehnder Interferometer (MZI). It is known that asymmetric MZIs have an almost sinusoidal wavelength response where its period is a function of the length difference of the arms of the asymmetric MZI. Therefore, channel spacing may be controlled by changing the arms length difference in an Asymmetric MZI.

7 Claims, 3 Drawing Sheets

MULTI-WAVELENGTH LASERS

FIELD OF THE INVENTION

This invention relates generally to optical communication systems and more particularly to optical laser sources with multiple lasing wavelengths.

BACKGROUND OF THE INVENTION

One way to utilize the large bandwidth of optical fibers is to use optical wavelength division multiplexing (WDM) schemes to increase the rate of data transmission through optical fibers. In the transmitter end of a WDM transmission system and network it is necessary to have number of laser sources with different wavelengths. Each laser light is then modulated either directly in the laser or by an external modulator to impress the data information on each of the WDM channels.

Multi-wavelength laser sources are desirable for optical wavelength division multiplexed (WDM) transmission systems and networks.

U.S. Pat. No. 5,910,962 introduces a multi-wavelength laser source which provides multiple laser signals at different wavelengths incorporating DBR (Distributed Bragg Reflector) fiber lasers or DFB (Distributed Feedback) fiber lasers. In the proposed design, a pumping laser with operating wavelength below 1500 nm is used. Each DFB or DBR laser is tuned to a selected wavelength in the 1550 nm range. The fiber lasers may be connected in series to each other to form a multi-wavelength source. There are a number of issues with respect to this arrangement. We can easily observe that the number of wavelength channels is very limited. As a result, it is very difficult to scale the source to have a large number of lasing channels. On the other hand, the processes of tuning each laser and consequently the whole set of wavelength channels are very challenging. Stability of the lasing frequencies is also of great concern.

M. Zirngibl et at. in "An 18 channel Multi-Frequency Laser," IEEE Photonics Technology Letter, Vol. 8, No. 7 July 1996 propose an array of semi-conductor optical amplifiers integrated monolithically with a ADM multiplexers/demultiplexers. In this architecture, a Wavelength Grating Router (WGR) is used as an intra-cavity wavelength selective filter element. The number of amplifiers and the complexity of the WDM filter increase as the number of lasing channels or, equivalently, as the channel spacing in a given wavelength range decreases. The wavelength selectivity of this device is governed by the geometric layout of the filter and a discrete choice of the gain elements. As a result, for a large number of wavelength channels, a large number of router arms are needed. The cost of these multi-wavelength laser sources is therefore, high and they cannot be easily fabricated for a large number of wavelengths or lasing channels. Similar designs have also been reported, such as R. Monnard et al. in "Direct Modulation of a Multi-frequency Laser up to 16×622 Mb/s," IEEE Photonics Technology Letters, Vol. 9, No. 6, June 1997.

It is therefore desirable to have a low cost multi-wavelength laser source with a large number of lasing channels.

SUMMARY OF THE INVENTION

In the present invention an optical gain element or medium is used where in a fraction of the optical output signal is passed through a periodic filter and fed back to the gain medium. This configuration simply forms a multi-wavelength ringer laser. The optical gain element provides the gain medium for the laser and the filter forces the laser to lase on the predetermined wavelengths. The periodic filter may simply be an asymmetric Mach-Zehnder Interferometer (MZI). It is known that asymmetric MZIs have an almost sinusoidal wavelength response, where the period is function of the length difference between the arms of the asymmetric MZI. In other words, one can control the channel spacing by changing the length difference of an asymmetric MZI.

BRIEF DESCRIPTION OF THE DRAWINGS

The preferred exemplary embodiments of the present invention will now be described in detail in conjunction with the annexed drawing, in which.

DETAILED DESCRIPTION OF THE PREFERRED EMBODIMENTS

Figure 1:
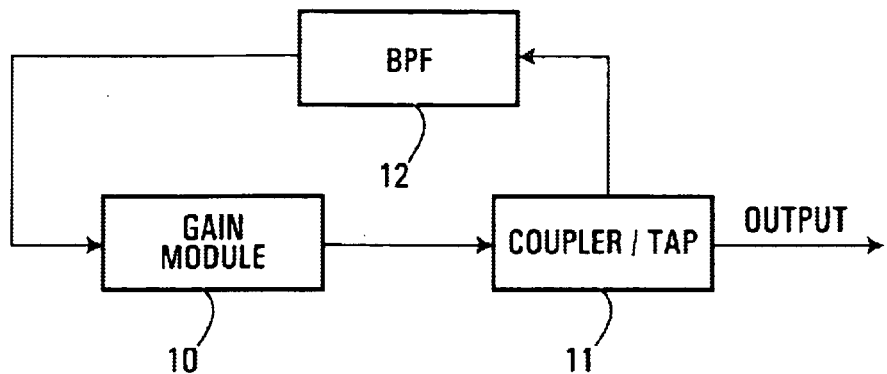
FIG. 1 presents the general structure of the multi-wavelength laser source introduced by this invention.
Figure 2:
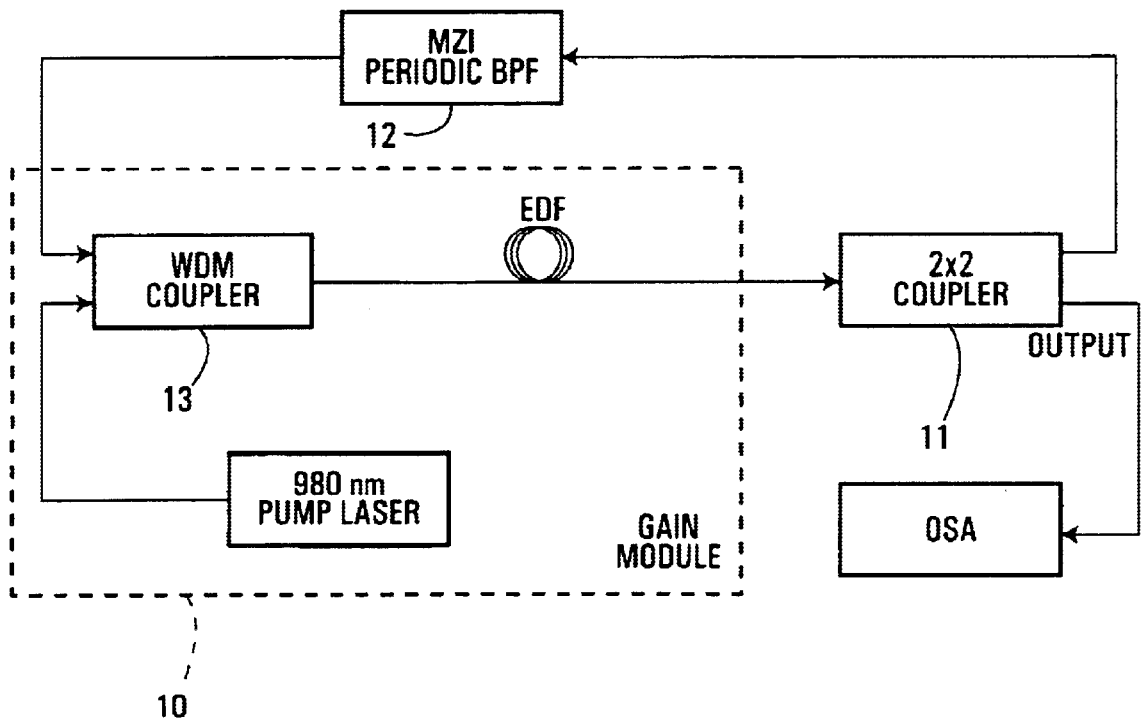
FIG. 2 illustrates the multi-wavelength laser source with an erbium doped fiber amplifier (EDFA)

This invention introduces a novel multi-wavelength laser source design with the general configuration shown in FIG. 1. In this typical configuration, a fraction of the optical output signal of an optical gain module 10 is filtered and fed back via top 11 and band-pass filter 12 to the gain medium. When there is no input signal to the gain module, the output of the module is referred to as the "free run" output. Any optical amplifier may be used for the gain module 10. In the following description, an Erbium Doped Fiber Amplifier (EDFA) is used for the gain module. FIG. 2 shows in more detail the main architecture with such an EDFA. The free run output of the EDFA is known as Amplified Spontaneous Emission (ASE) that is always present and usually treated as amplifier noise.

As shown in FIG. 2, a fraction of the ASE output (free run signal) of the EDFA is filtered and fed back to the EDFA via WDM coupler 13. If a relatively narrow band-pass filter (BPF) is used for the filter 12, the EDFA starts lasing at a frequency around the central frequency of the BPF 12. This architecture is also known as a "Ring Laser." Ring lasers have already been used in optical systems. In this invention, a novel cost efficient multi-wavelength laser source is provided using the same principles.

Figure 3:
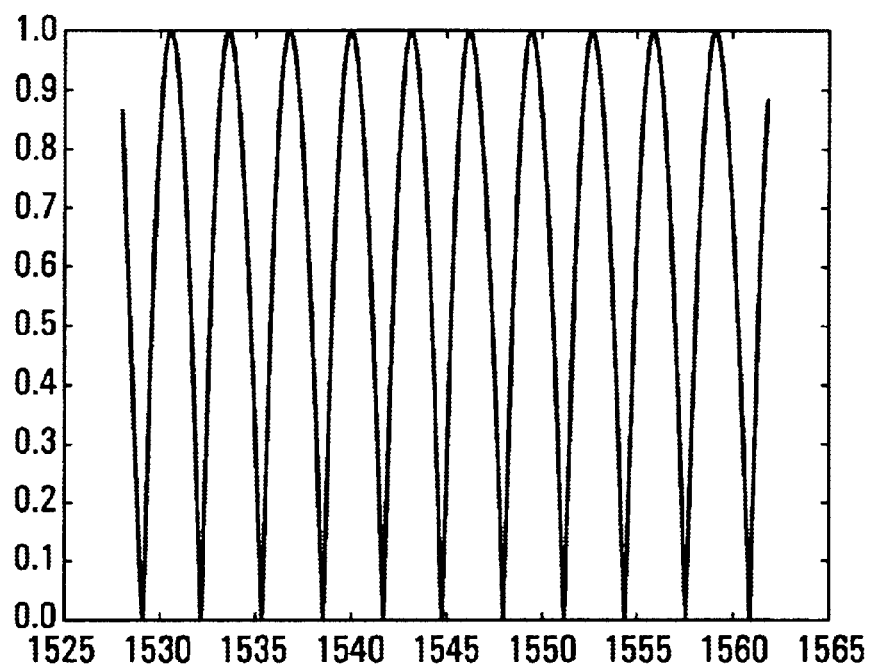
FIG. 3 shows a typical transfer function for a periodic Mach-Zehnder band-pass filter.
Figure 4:
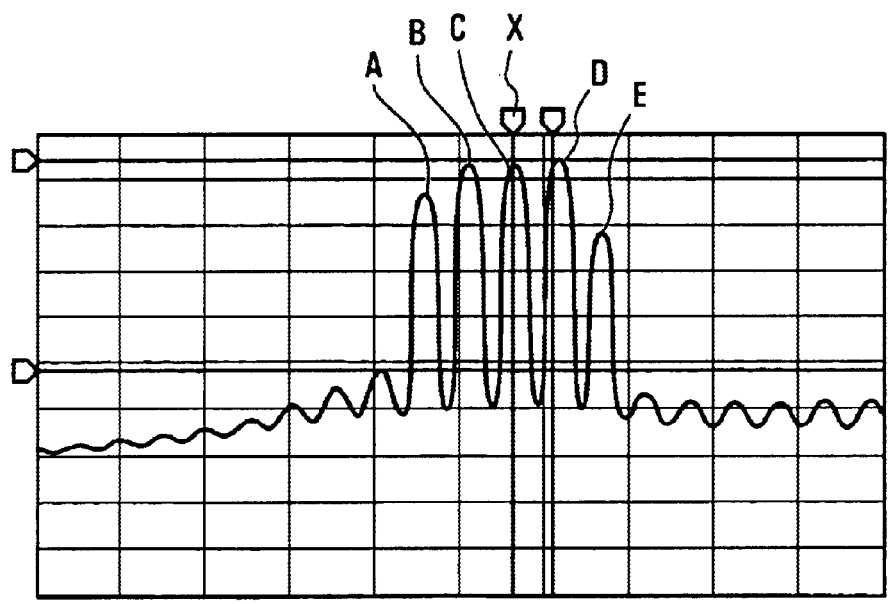
FIG. 4 shows the spectrum of the output signal of a multi-wavelength laser source for a ring laser using 3.5 m EDF.
Figure 5:
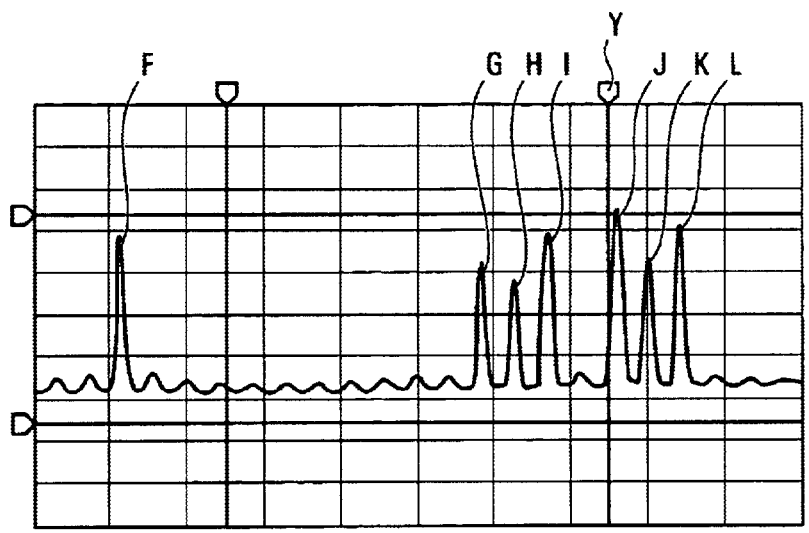
FIG. 5 displays the spectrum of the output signal of a multi-wavelength laser source for a ring laser using 10 m EDF.

As shown in FIG. 2, in the gain module 10, an Erbium Doped Fiber (EDF) forms the gain medium. The pump laser, which is usually a 980 nm laser, provides the optical power for the gain medium EDF. The pump laser output is coupled into the EDF by the WDM coupler 13. At the output of the gain module 10, the 2×2 optical coupler 11 is used to take a fraction of the output signal to be fed back to the gain module. The other output port of the coupler 11 provides the output of the laser source. In the configuration shown, the output is connected to an Optical Spectrum Analyzer (OSA). In the feedback path, the optical signal is filtered through the periodic filter, such as the Mach-Zehnder Interferometer (MZI) filter 12. This filter has a periodic filter response, which forces the gain module 10 to concentrate its energy in specific frequency (wavelength) bands and consequently to lase in those bands. A typical transfer function of such a filter (12) is shown in FIG. 3. In an ideal case, it is expected that one lasing source will be observed in each band-pass of the filter 12. This is basically true if the gain profile of the gain module 10 is flat throughout the frequency band of interest. Unfortunately, an EDFA does not have a flat gain transfer function and, consequently, lasing would be observed only in some of the desired wavelength channels, as shown in FIGS. 4 and 5. FIG. 4 shows the multi-wavelength laser source output observed by the OSA for the case of a 3.5 m EDF and 120 mW pump laser power. In this case, five different lasing signals A, B, C, D and E were obtained. By increasing the EDF length to 10 m, seven laser signals F, G, H, I J, K and L are obtained (FIG. 5) at different locations from those of the previous case. Since the gain profile of the EDFA is not flat, the lasing channels occur in the wavelength range that has the maximum gain. In the example shown in FIG. 4, the lasing appears mainly around the high gain region of the 1530 nm (X). However, as we increase the length of the EDF, another lasing region around the 1550 nm (Y) is also observed (FIG. 5). This is mainly because of the fact that for longer EDF there are two high gain regions of 1550 nm and 1530 nm. The 1550 nm region is the dominant one. In FIG. 5, that the number of lasing channels in the 1550 mn regions is more than that of the 1530 nm region.

Figure 6:
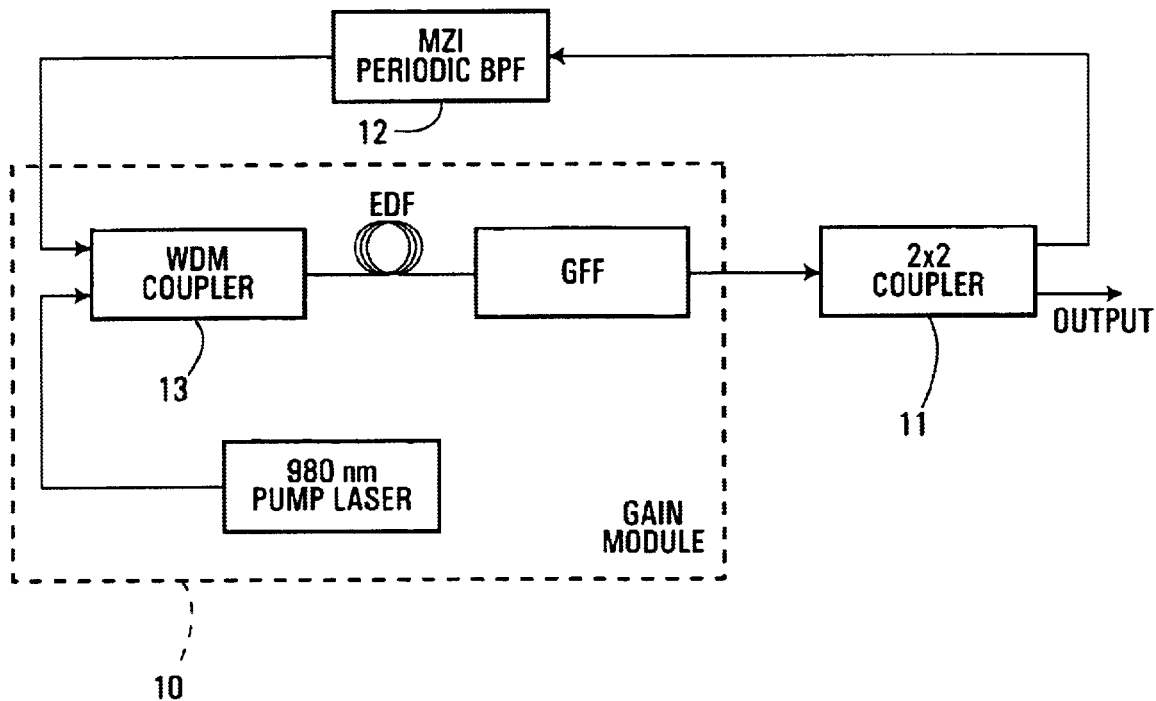
FIG. 6 shows a multi-wavelength laser source with Gain Flattened EDFA.

In order to increase the number of lasing channels, a gain flattening filter (GFF) is inserted between the EDF and the coupler 11, as shown in FIG. 6. This helps to reduce the competition among the different pass bands of the periodic BPF12 and to distribute the pump energy to all the desired bands uniformly. As a result, a multi-wavelength laser source is obtained.

In the design of a practical multi-wavelength laser source some other issues must be taken care of. The BPF12 needs to be stable to enable lasing in the pass bands and provide stable lasing channels. Some forms of polarization control might also be needed in the feedback loop to enhance effective feedback of the signals in all the bands.

The present invention has other advantages over other multi-wavelength laser sources introduced in the literature. Some advantages are simplicity, scalability and potentially low cost.

Note that the number of lasing channels in the frequency band of interest, where the gain module has a flat gain profile, is simply determined by the periodic BPF. An option for the periodic BPF filter is the MZI filter, which is not very expensive. The periodic BPF may be tuned to the ITU frequency grid to form a standard multi-wavelength laser source.

What is claimed is:

1. A multi-wavelength laser, comprising:

(a) a pump laser source;

(b) an optical gain module (OGM) which is pumped by the pump laser source;

(c) a periodic band-pass filter (BPF) in a feedback loop between output and input of the optical gain module; and (d) the output of the OGM being an output of said multi-wavelength laser;

wherein the OGM comprises a gain element and a gain flattening filter between the gain element and the periodic BPF.

2. multi-wavelength laser according to claim 1, further comprising:

an output coupler at the output of the OGM configured to send part of the OGM output to the periodic band-pass filter, and part of the output of the OGM as the output of the multi-wavelength laser; and an input coupler at the input of the OGM configured to couple both a pump signal from the pump laser source, and an output of the periodic band-pass filter into the OGM, the OGM having no other optical input signal.

3. A multi-wavelength laser according to claim 1, wherein the periodic bandpass filter comprises a Mach-Zehnder interferometer.

4. A multi-wavelength source according to claim 1, wherein at least two lasing sources are realized in different bands of said periodic band-pass filter.

5. A multi-wavelength source according to claim 1, further comprising polarization control means in the feedback loop to enhance effective feedback of signals in periodic bands of the periodic band-pass filter.

6. A multi-wavelength source according to claim 1, wherein the periodic bandpass filter is tuned to an ITU frequency grid to form a standard multi-wavelength laser source.

7. A method of generating a multi-wavelength laser signal comprising:

operating an optical gain medium with a feedback input and a pump laser source, and no other input;

feeding back a portion of an output of the optical gain medium through a gain-flattening filter and periodic band-pass filter, and passing an output of the periodic band-pass filter to the feedback input;

whereby a lasing source is realized in at least two bands of the periodic band-pass filter such that a laser signal having at least two wavelengths is generated.

* * * * *